US011911342B2

(12) United States Patent
Yan et al.

(10) Patent No.: US 11,911,342 B2
(45) Date of Patent: Feb. 27, 2024

(54) CONNECTOR FOR CONNECTING A MEDICAL INJECTION DEVICE TO A CONTAINER

(71) Applicant: Becton Dickinson France, Le Pont de Claix (FR)

(72) Inventors: Bo Yan, Shanghai (CN); Longxiang Huang, Suzhou (CN)

(73) Assignee: Becton Dickinson France, Le Pont de Claix (FR)

(*) Notice: Subject to any disclaimer, the term of this patent is extended or adjusted under 35 U.S.C. 154(b) by 10 days.

(21) Appl. No.: 17/058,201

(22) PCT Filed: May 24, 2019

(86) PCT No.: PCT/EP2019/063514
§ 371 (c)(1),
(2) Date: Nov. 24, 2020

(87) PCT Pub. No.: WO2019/224372
PCT Pub. Date: Nov. 28, 2019

(65) Prior Publication Data

US 2021/0186815 A1 Jun. 24, 2021

(30) Foreign Application Priority Data

May 25, 2018 (EP) .................................... 18305642

(51) Int. Cl.
*A61J 1/20* (2006.01)
*A61J 1/14* (2023.01)

(52) U.S. Cl.
CPC ........... *A61J 1/2096* (2013.01); *A61J 1/1412* (2013.01); *A61J 1/201* (2015.05); *A61J 1/2027* (2015.05)

(58) Field of Classification Search
CPC ........ A61J 1/2096; A61J 1/1412; A61J 1/201; A61J 1/2027; A61J 1/2051; A61J 1/2065;
(Continued)

(56) References Cited

U.S. PATENT DOCUMENTS 4,568,346 A * 2/1986 van Dijk ............... A61J 1/2096 604/234
5,261,902 A * 11/1993 Okada ................ B65D 81/3211 604/416
(Continued)

FOREIGN PATENT DOCUMENTS

EP 0107873 A1 5/1984
EP 1205173 A2 5/2002
(Continued)

OTHER PUBLICATIONS

Galvin et al., "Platform Technologies—Transforming Development", Drug Development & Delivery, Oct. 2017, 77 pages, vol. 17:7.

*Primary Examiner* — Nicholas J. Weiss
*Assistant Examiner* — Brandon W. Levy
(74) *Attorney, Agent, or Firm* — The Webb Law Firm

(57) ABSTRACT

A connector for connecting a medical injection device, including a barrel and a needle extending from a distal tip of the barrel, to a container including a septum includes an inner deformable cover and an outer rigid cover. The inner deformable cover extends along a cover axis and includes a proximal connection part configured to engage the distal tip of the barrel and a distal portion. The outer rigid cover encloses the inner deformable cover and includes a distal adaptor configured to engage the container. The outer cover is configured so the needle tip extends into the distal adaptor when the proximal connection part of the inner deformable cover engages the distal tip of the barrel. The outer rigid cover is fixed to the inner deformable cover. The inner
(Continued)

deformable cover is compressible between a relaxed configuration and a compressed configuration.

19 Claims, 5 Drawing Sheets

(58) Field of Classification Search
CPC ...... A61J 1/2055; A61J 1/1406; A61J 1/2048; A61J 1/2013; A61J 1/1475; A61J 1/1425; A61J 1/2089; A61M 5/321; A61M 2039/1072; A61M 2039/1044; A61B 10/0045
See application file for complete search history.

(56) References Cited

U.S. PATENT DOCUMENTS

| | | | | | |
|---|---|---|---|---|---|
| 5,827,262 | A * | 10/1998 | Neftel | A61J 1/2096 604/82 |
| 6,022,339 | A | 2/2000 | Fowles et al. | |
| 6,253,804 | B1 * | 7/2001 | Safabash | A61J 1/2096 604/416 |
| 8,177,768 | B2 | 5/2012 | Leinsing | |
| 10,010,677 | B2 | 7/2018 | Shluzas et al. | |
| 11,491,085 | B2 | 11/2022 | Mijers et al. | |
| 2003/0199846 | A1 * | 10/2003 | Fowles | A61J 1/1406 604/411 |
| 2004/0097882 | A1 | 5/2004 | Dibiasi et al. | |
| 2011/0004183 | A1 | 1/2011 | Carrez et al. | |
| 2014/0096862 | A1 | 4/2014 | Aneas | |
| 2014/0261861 | A1 | 9/2014 | Ivosevic et al. | |
| 2014/0261877 | A1 * | 9/2014 | Ivosevic | A61J 1/2048 141/27 |
| 2015/0246352 | A1 * | 9/2015 | Bullington | A61B 5/154 422/546 |
| 2016/0279333 | A1 * | 9/2016 | Shluzas | A61M 5/5066 |
| 2016/0287475 | A1 * | 10/2016 | Yevmenenko | A61J 1/2096 |

FOREIGN PATENT DOCUMENTS

| | | | | |
|---|---|---|---|---|
| EP | 2893916 | A1 * | 7/2015 | A61J 1/20 |
| FR | 2717086 | A1 | 9/1995 | |
| JP | S59118164 | A | 7/1984 | |
| JP | H06225940 | A | 8/1994 | |
| JP | H09502116 | A | 3/1997 | |
| JP | 2004283554 | A | 10/2004 | |
| JP | 2014522280 | A | 9/2014 | |
| JP | 2014236906 | A | 12/2014 | |
| JP | 2017515556 | A | 6/2017 | |
| WO | 03066152 | A2 | 8/2003 | |
| WO | 2009112535 | A1 | 9/2009 | |
| WO | 2013115730 | A1 | 8/2013 | |
| WO | 2017155405 | A1 | 9/2017 | |
| WO | 2018234818 | A1 | 12/2018 | |

* cited by examiner

CONNECTOR FOR CONNECTING A MEDICAL INJECTION DEVICE TO A CONTAINER

CROSS-REFERENCE TO RELATED APPLICATIONS

This application is the United States national phase of International Application No. PCT/EP2019/063514 filed May 24, 2019, and claims priority to European Patent Application No. 18305642.3 filed May 25, 2018, the disclosures of which are hereby incorporated by reference in their entirety.

BACKGROUND OF THE INVENTION

Technical Field of the Invention

The invention relates to a connector for connecting a medical injection device to a container. The invention also relates to an assembly comprising the connector and the injection device connected to each other, and a method for filling the injection device with a composition contained in a container by connecting the injection device to the container via the connector.

Technical Background

In the field of medicament packaging, it is known to store a drug content, in the form for example of a lyophilized drug, a powder drug or an active substance of a drug, in a medical container usually referred to as a “vial”. A vial is typically made of glass and is sealed by an elastomer septum that is crimped by an aluminum cap. A portion of elastomer at the center of the septum is covered by a plastic part or an aluminum part which can be removed by the healthcare professional prior reconstitution procedure so that the healthcare professional can access to a central portion of the septum that can be pierced by a needle.

To reconstitute the drug, the user uses usually a disposable plastic syringe to transfer the diluent from an ampoule or a vial into the vial containing the lyophilized drug or power drug. When the diluent is already stored in a prefilled syringe, typically made of glass, the healthcare professional transfers the diluent directly from the syringe to the vial containing the lyophilized drug or power drug. The healthcare professional uses for this transfer a needle to pierce the rubber septum of the vial.

During such process, it is hard for the healthcare professional to prick the central portion of the septum.

Moreover, the needle tip may be damaged, due to piercing of the septum of the vial, and/or misalignment during insertion of the needle. A damaged or bent needle may lead to severe injuries of the patient during the injection of the drug. The risk of damaging the needle as described above arises in particular in the case where the injection device is a needle staked prefillable syringe (PFS). In such case, the needle is fixed to the body of the syringe during manufacture of the syringe and thus cannot be removed during the process or replaced by a new needle.

Another major drawback of the known processes is that, during the process, the needle is left free and unprotected. This represents a high risk of accident for the user as well as for the patient or any person around who were to come into contact with the needle, and may lead to severe injuries.

Furthermore, when the user withdraws the reconstituted drug from the vial, the needle being inserted in the vial, the user needs to adjust the length of the portion of the needle that is inserted in the vial as the amount of drug in the vial decreases. In a practical way, the user needs to slowly draw the needle back from the container by pulling the syringe away from the vial, so that the opening of the needle constantly remains in contact with the drug, in other terms, below the surface of the drug.

Not only this handling is hard to perform, but also such movement of the needle in the vial may lead to a loss of a significant amount of drug that remains in the vial.

SUMMARY OF THE INVENTION

The invention aims to provide a connector that overcomes the drawbacks detailed previously. In that matter, the invention aims to provide a connector for connecting a medical injection device, such as a syringe or the like, to a container, such as a vial or the like, that overcomes the issues arising from piercing of the septum of the container, and/or misalignment during insertion of the needle, in particular a damaged or bent needle that may lead to severe injuries of the patient during the injection of the drug.

To this end, one object of the invention is a connector for connecting a medical injection device comprising a barrel and a needle extending from a distal tip of the barrel, to a container comprising a pierceable septum, said connector comprising:

- an inner deformable cover extending along a cover axis, the inner deformable cover comprising a proximal connection part configured to engage the distal tip of the barrel, and a distal portion pierceable by the needle,
- an outer rigid cover enclosing the inner deformable cover and comprising a distal adaptor configured to engage the container, said outer cover being configured such that the needle tip extends into the distal adaptor when the proximal connection part of the inner deformable cover engages the distal tip of the barrel, wherein the inner deformable cover is compressible along the cover axis between:

- a relaxed configuration wherein the distal portion of the inner deformable cover covers the needle tip,
- a compressed configuration wherein the distal portion is pierced by the needle, the needle tip extending distally out of said distal portion.

According to a preferred embodiment, the outer rigid cover is fixed to the inner deformable cover. Having both the inner and outer covers gathered in one connector assembly facilitates the implementation of a reconstitution process as it requires the handling of a reduced number of pieces by the user to connect the medical injection device to the container comprising the pierceable septum.

In the relaxed configuration, the distal portion of the inner deformable cover is in a first, distal, position relative to the outer rigid cover, said first position being configured such that the distal portion covers the needle tip.

In the compressed configuration, the distal portion is in a second, proximal, position relative to the outer rigid cover, said second position being configured such that the distal portion is pierced by the needle, the needle tip extending distally out of said distal portion.

In the relaxed configuration, before connecting the connector to the container, the needle of the medical injection device is sealed by the distal portion of the inner deformable cover covering the needle tip. The transition of the inner deformable cover from the relaxed configuration to the compressed configuration allows a portion of the needle of a predetermined length to protrude distally from said inner deformable cover and to pierce the septum of the container when the distal adaptor of the outer rigid cover engages the container. Hence, optimal adjustment of the length of the portion of the needle that is inserted in the container, when drawing the reconstituted drug back to the injection device, is achieved. This reduces the number and the difficulty of the manipulations generally performed in that matter, and allows the withdrawal of substantially all the reconstituted drug from the container. Besides, the distal portion of the inner deformable cover can only be pierced when a container is inserted into the distal portion of the distal adaptor.

Moreover, the connector prevents any risk of injury arising from the needle of the injection device being left free and unprotected, and maintains the sterility of a composition contained in the injection device.

The connector also enables to center the needle with respect to the septum so that it is easier for the healthcare professional to prick the central part of the septum.

In this application, the term "proximal" is related to the part of the connector that is configured to be connected to the medical injection device. The term "distal" is related to the part of the connector that is configured to be connected to the container. The distal direction also corresponds to the direction of injection of a composition contained in the barrel through the needle of the medical injection device when connected to the connector.

According to other optional features of the connector of the invention:

- The inner deformable cover comprises at least one deformable portion configured to form a bulge extending radially when said inner deformable cover is in the compressed configuration.
- The deformable portion comprises at least one bellow. Such bellow folds readily in the axial direction when the inner deformable cover transitions from the relaxed configuration to the compressed configuration, and takes up little space.
- The outer rigid cover comprises an intermediate portion configured to accommodate the deformable portion of the inner deformable cover in the relaxed configuration and in the compressed configuration.
- The distal adaptor comprises a stop wall which extends radially relative to the cover axis, and a skirt which extends from the stop wall in a distal direction, the skirt defining a housing configured to engage a collar of the container in a position wherein the pierceable septum of the container faces the stop wall, the stop wall being configured to act as a physical stop for the septum that prevents further movement of the container in the proximal direction.
- The stop wall is provided with an opening forming a passage for the distal portion of the inner deformable cover, said stop wall being located so that a portion of the needle of a determined length protrudes distally from said stop wall. Hence, during insertion of the collar of the container, the septum contacts the needle and is pierced by the needle.
- In relaxed configuration, the distal part of the inner deformable cover protrudes distally from the stop wall. Hence, during insertion of the septum of the container, the septum may push the distal portion of the inner deformable cover until abutment against the stop wall. During insertion of the container in the distal adaptor, the distal part of the inner deformable cover is pushed by the septum so that it is retracted and so that the needle is exposed. The needle may then prick the central part of the septum.
- The skirt is adapted to deflect radially outwardly when connected to the container. This allows the skirt to adapt to the dimensions of the collar of the container. Connecting the connector to the container is thus easier.
- The skirt is provided with a plurality of flexible tabs separated from each other by recesses, the flexible tabs being configured to deflect radially outwardly when the skirt is connected to the container. The flexible tabs render the skirt more flexible and the skirt further fits to the collar of the container.
- The inner surface of the skirt is provided with a plurality of ribs configured to contact the collar of the container for maintaining said container in a fixed position relative to the skirt. Such ribs allow smooth insertion of the collar in the housing while preventing said collar to come out of the housing when the user drops the container after insertion.
- The connector further comprises a sealing cap arranged at a distal end of the skirt.
- The inner deformable cover comprises a first flange that abuts against a groove of the outer rigid cover, for preventing any axial movement of the proximal connecting part of the inner deformable cover with respect to the outer rigid cover.
- At least the deformable portion of the inner deformable cover is preferably made of elastomer material, for example rubber or TPE.
- The outer rigid cover is preferably made of a plastic material.

Another object of the invention is an assembly comprising:

- a medical injection device comprising a barrel and a needle extending from a distal tip of the barrel,
- a connector as described previously, wherein the inner deformable cover engages the tip of the barrel, and wherein the needle tip extends into the distal adaptor, said needle tip being accommodated in a proximal part of the distal portion of the inner cover.

According to an embodiment of the assembly, the needle of the medical injection device is staked in the tip of the barrel.

The medical injection device is preferably a pre-filled syringe.

Another object of the invention a method for filling a medical injection device with a composition contained in a container closed by a pierceable septum, the method comprising the following steps:

- providing a prefilled medical injection device and a connector as described previously connected to the tip of the injection device,
- connecting the connector to the container by engaging the distal adaptor with the container, so that the inner deformable cover transitions from the relaxed configuration to the compressed configuration,
- transferring in the container a first composition contained in the injection device through the needle,
- mixing the first composition with a second composition contained in the container,
- drawing the mixed compositions from the container back to the injection device,
- separating the injection device from the connector.

According to other optional features of the method:

- Prior to connecting the connector to the container, the proximal connection part of the deformable cover is removably connected to the tip of the injection device.

The first composition is a diluent and the second composition is a drug to be reconstituted.

BRIEF DESCRIPTION OF THE DRAWINGS

Further features and advantages of the invention will become apparent from the detailed description to follow, with reference to the appended drawings, in which.

DETAILED DESCRIPTION OF THE INVENTION

The invention relates to a connector for connecting a medical injection device, having a barrel and a needle extending from a distal tip of the barrel, to a container comprising a pierceable septum. Such connector is configured to be connected to the injection device which is preferably previously filled with a medical composition, called prefilled injection device. The assembly resulting of the connection of the connector to the barrel is stored before use, meaning before injection of the composition contained in the barrel in a vial. The composition contained in the barrel is preferably a diluent for lyophilized drug or for powder drug.

Figure 1A:
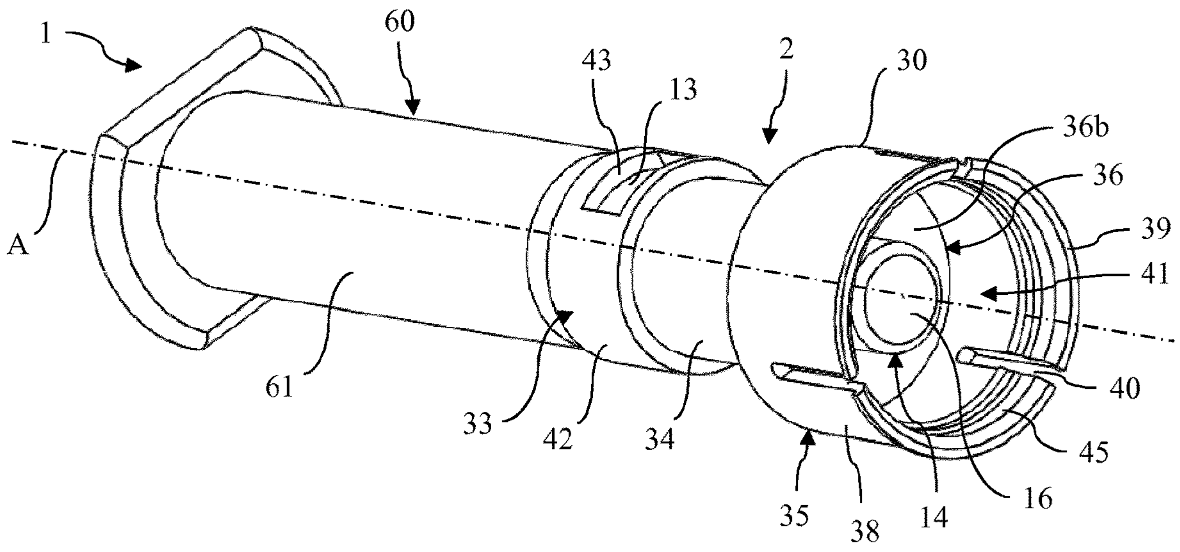
FIG. 1A is a perspective view of an embodiment of an assembly, said assembly comprising a connector having an outer rigid cover and an inner deformable cover arranged therein, and an injection device that engages the connector, wherein the inner deformable cover is in a relaxed configuration.
Figure 1B:
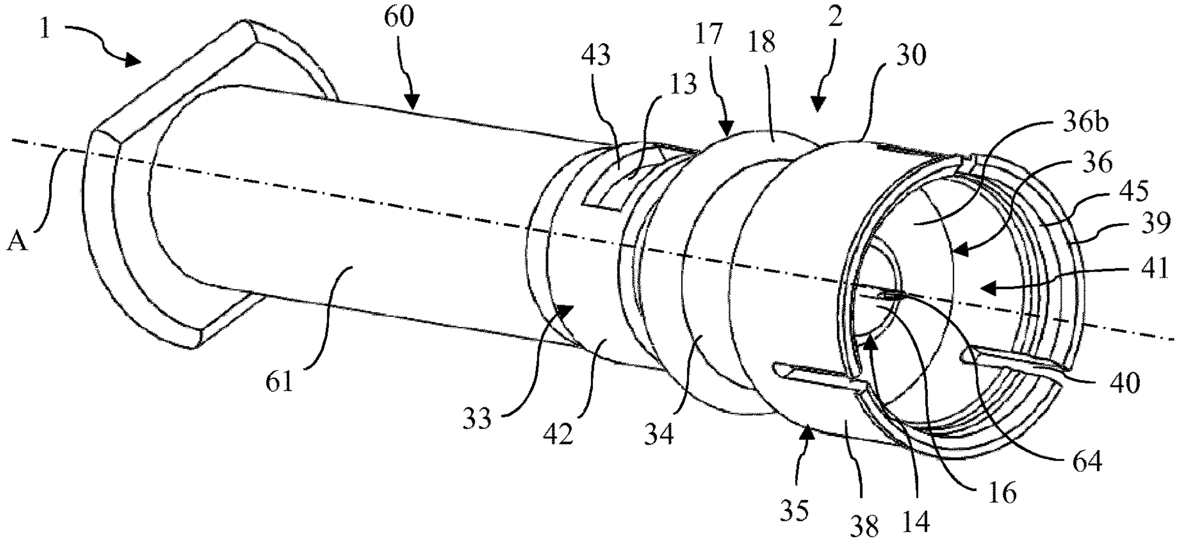
FIG. 1B is a perspective view of the assembly of FIG. 1A, wherein the inner deformable cover is in a compressed configuration.

A general view of an embodiment of the assembly 1 is represented in FIGS. 1A and 1B.

According to this embodiment, the connector 2 comprises an inner deformable cover 10 and an outer rigid cover 30 that encloses the inner deformable cover.

The inner deformable cover 10 extends along a cover axis A, from a proximal connection part 13 to a distal portion 14, and has a substantially cylindrical shape. The inner deformable cover comprises a body 11, called inner body, which defines a hollow inner volume 12. Said inner volume is opened proximally via an opening 15 configured to engage the tip 62 of the barrel 61, and closed distally by a distal portion 16. Said distal portion 16 is adapted to be pierced by the needle tip 64 of the injection device.

The inner deformable cover 10 is provided with at least one deformable portion 17 that is compressible along the cover axis A. The deformable portion 17 is adapted to deform when the inner deformable cover 10 is constrained axially in the proximal direction and transitions from a relaxed configuration illustrated in FIG. 1A to a compressed configuration illustrated in FIG. 1B.

To that end, the deformable portion 17 is made of a deformable material, such as rubber or a thermoplastic elastomer (TPE) for example. The inner deformable cover as a whole may be made of a deformable material, for reducing the production costs and make the manufacture easier.

According to the embodiment illustrated in FIGS. 1A and 1B, the deformable portion 17 is formed by a radially enlarged portion of the inner body adapted to deform further radially outwardly when the inner deformable cover transitions from a relaxed configuration to a compressed configuration.

In FIG. 1A, the inner deformable cover 10 is in the relaxed configuration. The deformable portion 17 may have the shape of a bulge 18 that extends radially outwardly from the rest of the body 11. The diameter and the inner volume of the inner body are thus greater at the bulge 18 than in the rest of the body. Having a deformable portion in the shape of a bulge facilitates the transition of said deformable portion from the relaxed configuration to the compressed configuration. Indeed, since the deformable portion 17 is already deformed radially relative to the rest of the body 11, the axial constraints needed to be applied to the deformable portion are lower than in a configuration wherein the deformable portion is aligned with the rest of the inner body.

Figure 2A:
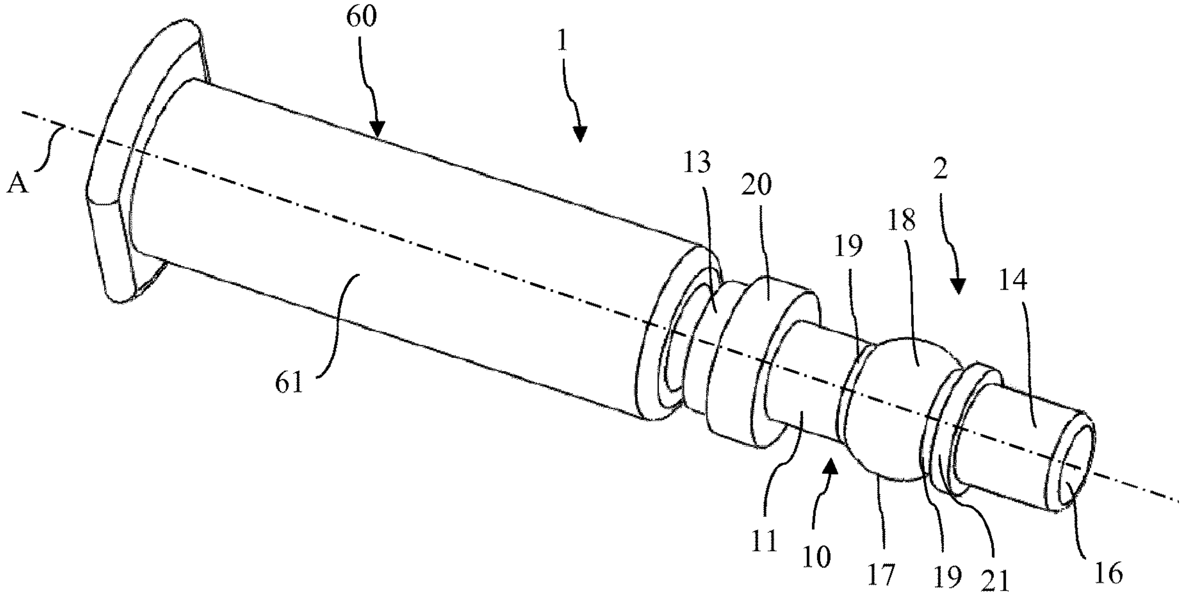
FIG. 2A is a perspective view of an embodiment of the assembly, wherein the inner deformable cover is in a relaxed configuration, the outer rigid cover being not represented.
Figure 2B:
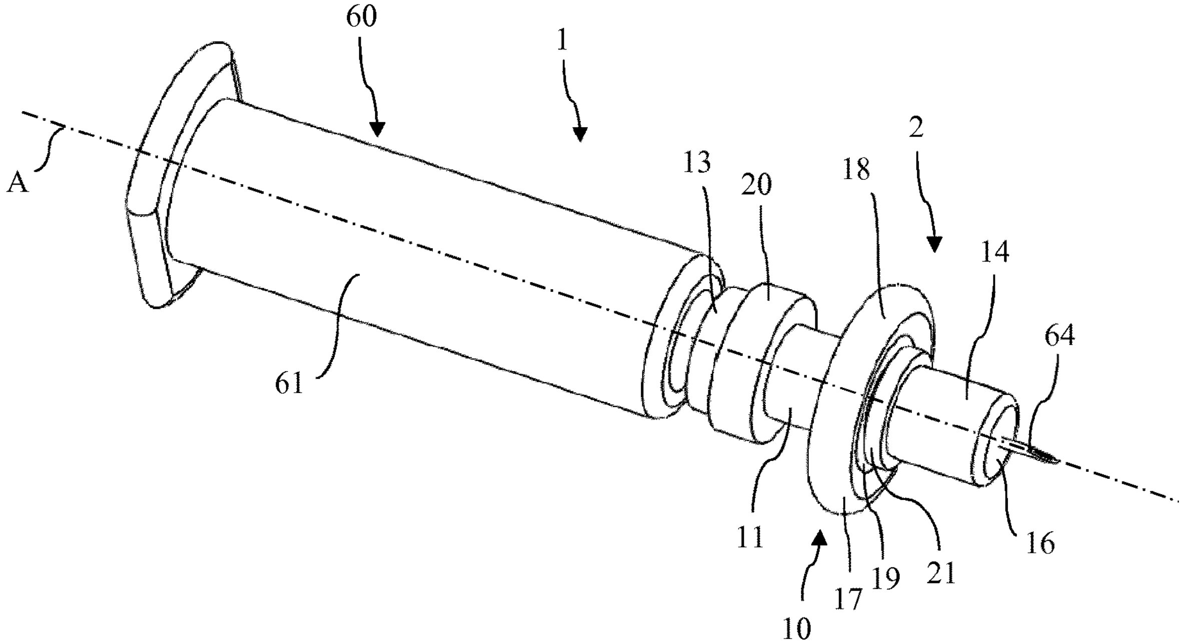
FIG. 2B is a perspective view of the assembly of FIG. 2A, wherein the inner deformable cover is in a compressed configuration.
Figure 3A:
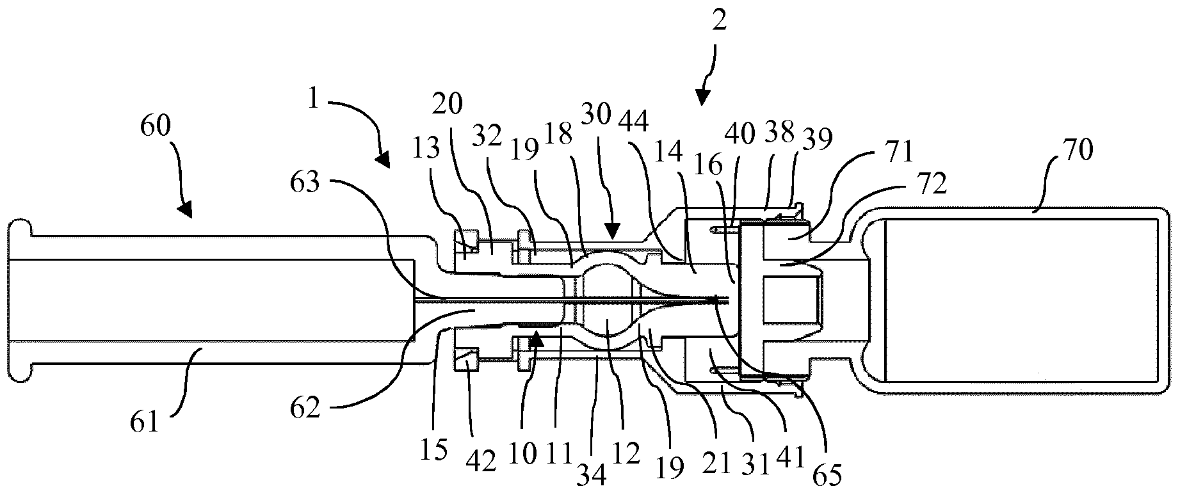
FIG. 3A is a side sectional view of an embodiment of the assembly connected to a container, wherein the inner deformable cover is in a relaxed configuration.
Figure 3B:
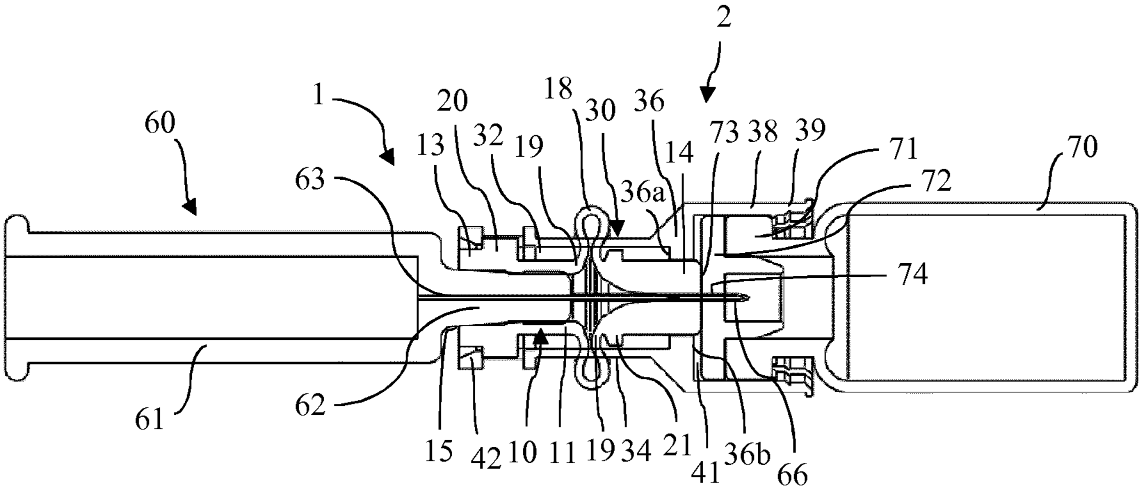
FIG. 3B is a side sectional view of the assembly of FIG. 3A, wherein the container is further inserted in the connector, the inner deformable cover being in a compressed configuration.
Figure 4A:
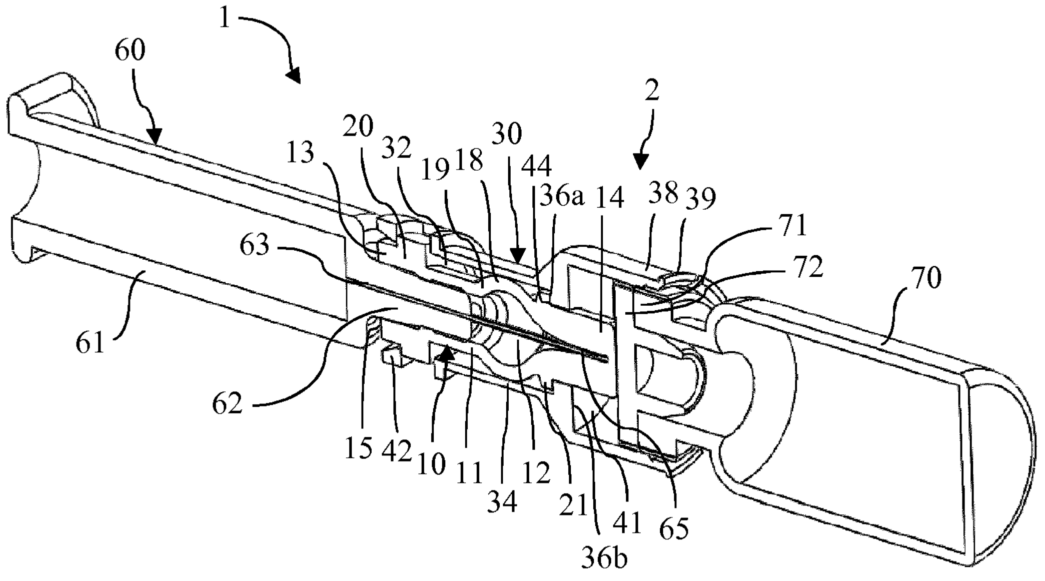
FIG. 4A is a perspective sectional view of the assembly of FIG. 3A.
Figure 4B:
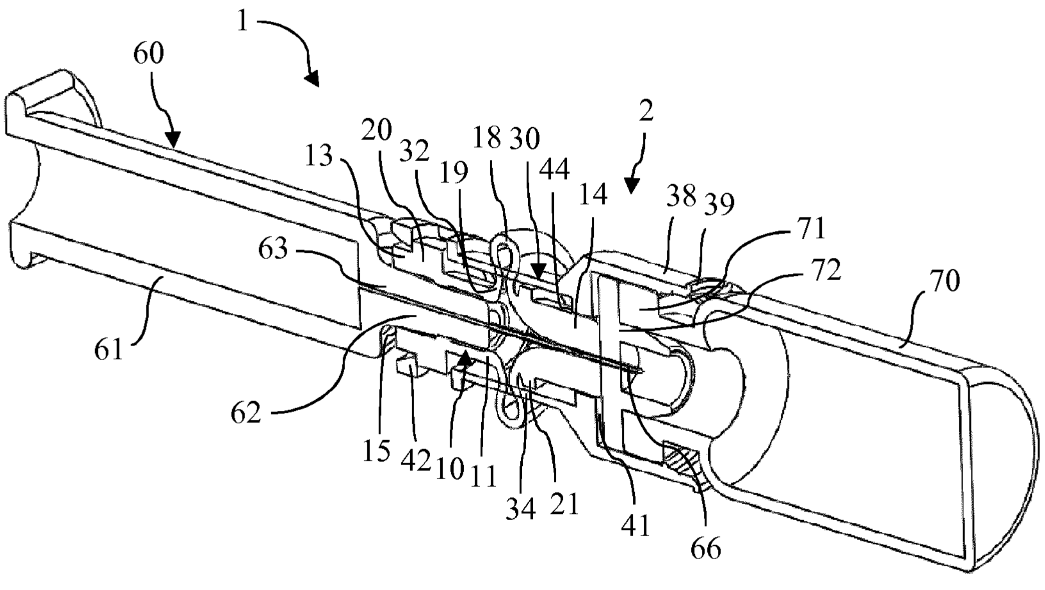
FIG. 4B is a perspective sectional view of the assembly of FIG. 3B.
Figure 5:
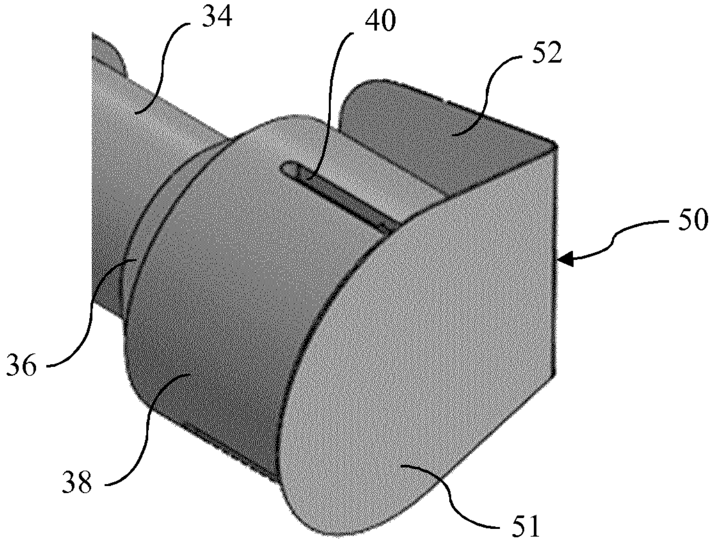
FIG. 5 is a perspective view of a distal part of the outer portion, with a sealing cap mounted thereon.

For convenience, in FIGS. 2B, 3B, and 4B, the bulge 18 is represented as protruding outside the outer rigid portion 30. However, the bulge 18 preferably extends in the rigid cover, whether the inner cover is in the relaxed configuration or in the compressed configuration.

According the embodiment illustrated in FIGS. 1A and 2A, the bulge 18 forms a bellow delimited by axial limiting portions 19 adapted to get closer to each other so as to allow compression of the bellow and radial extension of the bulge 18.

It is understood that the connector may comprise a plurality of deformable portions, and in particular, a plurality of bellows adapted to compress and relax to as to cause the bulges to radially increase or decrease respectively.

The transition of the deformable portion 17 from the relaxed configuration to the compressed configuration will be described in more details in the following.

The inner deformable cover 10 is enclosed in the inner volume 32 of the outer rigid cover 30, whose body 31, called outer body, extends along the cover axis A around said inner deformable cover. The outer rigid cover has a substantially cylindrical shape.

As illustrated in FIGS. 1A and 1B, the outer rigid cover 30 comprises a proximal part 33 that encloses the proximal connection part 13, an intermediate part 34 that encloses the deformable portion 17, and a distal part 35 that extends in a distal direction from the intermediate part.

The outer rigid cover 30 protects the inner deformable cover 10 from the outside and is directly in contact with the user during use of the connector. Hence, the outer rigid material is made of a material adapted to ensure optimal use of the connector without deforming, such as a plastic material for example. This plastic material may be acryl butadiene styrol (ABS), polycarbonate (PC), polyethylene or polypropylene.

According to a preferred embodiment, the proximal connection part 13 of the inner deformable cover 10 is provided with a first flange 20 that extends radially outwardly from the inner body. The flange 20 is accommodated in a groove 42 of a corresponding shape at the proximal part 33 of the outer cover. Hence, the proximal connection part 13 of the inner cover is maintained in a fixed position relative to the outer cover 30. Preferably, the first flange 20 and the groove 42 prevent the inner cover 10 to rotate relative to the outer cover 30 about the cover axis A.

Fixing the inner deformable cover to the outer rigid cover allows providing the connector as a single assembly and thus reduces the number of pieces to be handled by the user.

The proximal part 33 of the outer cover may advantageously be provided with a through slot 43 that allows the user to make sure that the inner cover 10 is enclosed in the outer cover 30.

The intermediate part 34 and the distal part of the outer cover are delimited by a wall 36, called stop wall.

The stop wall 36 is provided with an opening 44 through which the distal part 14 of the inner deformable cover extends.

According to a preferred embodiment, the distal part 14 of the inner cover is provided with a second flange 21 that extends radially outwardly from the inner body 11. The second flange 21 is adapted to abut against an axial stop of the outer rigid cover. In the embodiment of the device illustrated in FIGS. 3A-B and 4A-B, the axial stop 46 is the proximal surface 36*a* of the stop wall 36.

The distal part 35 of the outer cover comprises a distal adaptor, including the stop wall 36 that flares radially outwardly from the outer body 31, and a skirt 38 that extends in the distal direction from the stop wall 36.

The distal adaptor 35 is adapted to be connected to the collar 71 of the container. To that end, the skirt 38 defines a housing 41 with a substantially cylindrical shape that matches the shape of the collar 71. Hence, when the distal adaptor 35 is connected to the container, the skirt 38 encloses the collar 71 of the container.

According to a preferred embodiment, the skirt 38 is preferably elastically deformable so that it may be deflected radially outwardly for connecting the skirt to the container. To that purpose, the skirt may be made of an elastic material, such as polyolefin, polypropylene. Alternatively or in combination, the skirt may also comprise a plurality of flexible tabs 39 separated from each other by recesses 40, said tabs being adapted to deflect radially outwardly for connecting the skirt to the container. The skirt 38 thereby further fits to the dimensions of the collar 71, making the connection of the skirt to the container easier.

The inner surface of the skirt 38, and in particular the inner surface of the tabs 39, is provided with a plurality of ribs 45 parallel to each other, that extend along the circumference of the skirt 38. The ribs 45 have a shape that matches the shape of corresponding ribs, not represented, provided in the collar 71 of the container. Hence, when the skirt 38 is connected to the container 70, the collar 71 is prevented to fall off from the housing 41. An advantage of such ribs is that they allow smooth insertion of the collar in the housing while preventing said collar to come out of the housing when the user drops the container after insertion. Of course, other retaining means may be provided, without departing of the scope of the invention.

The connector 2 is preferably provided with a sealing cap 50 configured to be mounted on the distal end of the skirt 38 so as to close the housing 41. The sealing cap is mounted on the connector during storage of the sterilized assembly, the barrel being filled with the composition. Hence, the sealing cap ensures protection of the sterilized housing and inner cover, thus preventing any contamination of the needle and the composition contained in the barrel.

In a preferred embodiment, the sealing cap 50 comprises a closing cap 51 mounted on the distal end of the skirt 38, and a tongue 52 extending from an end of the closing cap, preferably in an axial direction. Just before use, the user pulls on the tongue 52, which causes removal of the closing cap 51 from the skirt 38, thus facilitating the removing of the sealing cap 50.

FIGS. 3A and 4A are sectional view the assembly 1, wherein the container 70 is partially inserted in the housing 41 of the skirt 38. The inner cover is in the relaxed configuration.

In reference to FIGS. 3A and 4A, the tip 62 of the barrel is inserted in the inner volume 12 of the inner cover via the proximal opening 15. The tip is preferably inserted in force, and remains inserted and fixed at least axially relative to the inner cover thanks to the friction between the inner surface of the inner body and the outer surface of the tip.

During the insertion of the tip 62 of the barrel, the inner cover 10 remains in a fixed position relative to the outer cover 30 thanks to the first flange 20 accommodated in the ring 42 and the second flange 21 that abuts against the distal surface 36*b* of the stop wall 36.

The needle 63 extends from the tip 62 of the barrel in the inner volume 12 of the inner body along the cover axis A, up to the distal part 14 of the inner volume, in the vicinity of the distal portion 16 of the inner cover.

The distal portion 14 of the inner cover 10 is in a first, distal, position relative to the outer rigid cover 30. Said distal part 14 extends through the opening 44 of the stop wall 36, and protrudes in the distal direction from said stop wall, inside the housing 41. A corresponding portion 65 of the needle of a predetermined length, including the needle tip 64, also protrudes in the distal direction from said stop wall 36, in the housing 41.

The length of the protruding portion 65 of the needle may be adjusted depending on the needle length needed for the treatment. The length of the inner cover and of the outer cover are then adapted depending on the length chosen for the needle.

In FIGS. 3A and 4A, the inner cover 10 is in the relaxed configuration. In this configuration, the bulge 18 slightly extends radially outwardly from the rest of the inner body 11. The bulge 18 is remote from the inner surface of the outer body 31. In the relaxed configuration, the bulge preferably is a small bulge with a diameter that is slightly greater than that of the rest of the inner body.

In reference to FIGS. 3B and 4B, the container 70 is further inserted in the housing 41 of the skirt.

The collar 71 slides in a proximal direction along the inner surface of the skirt 38, said skirt thereby acting as a guide for the insertion of the container. When present, the tabs 39 advantageously deflect radially outwardly to facilitate the insertion of the container.

Further movement of the container 70 in the proximal direction causes said container to push the inner protruding portion of the inner cover 10 in the proximal direction. The inner protruding portion moves in the proximal direction relative to the needle 63 and the outer cover 30, and gets closer to the proximal connection part 13. As a result, the distal portion 14 is in a second, proximal, position relative to the outer rigid cover. The inner deformable cover 10 compresses, and the needle 63 pierces the distal portion 16 of the inner cover and the septum 72.

As a result, a portion 66 of the needle including the needle tip is located inside the container. This needle portion 66 inside the container 70 corresponds to the protruding portion 65 of the needle minus the thickness of the septum 72. The needle portion 66 may be further adjusted by adjusting the gap between the distal surface 36*b* of the stop wall 36 and the septum 72, in other terms, by further pushing the container 70 in the housing so that the gap decreases.

Complete insertion of the container in the housing corresponds to a configuration wherein the septum 72 abuts against distal surface 36*b* of the stop wall 36, said distal surface 36*b* thereby acting as a physical stop for the septum 72 that prevents further movement of the container in the proximal direction. The housing 41 is thus filled with the collar of the container. In this configuration, the inner distal portion 16 of the inner cover is aligned with the stop wall 36 of the outer cover. In other terms, the inner and stop walls have about the same axial position and the inner distal portion no more protrudes from the stop wall. The exposed length of the needle portion 66 inserted in the container is thus maximal.

Since the needle 63 extends along the cover axis A inside the inner cover, in the housing 41 of the skirt, and said skirt 38 encloses the collar of the container, the needle 63 is centered relative to the top surface 73 of the septum of the container. This allows the insertion of the needle at the center 74 of said top surface of the septum, the center portion 74 of the septum being typically pierceable. Hence, the needle does not contact the portion of the septum than cannot by pierced, and any deformation of the needle is thus prevented.

The axial compression of the inner cover 10 induces a corresponding deformation of the deformable portion 17.

In more details, as the inner distal portion 14 moves in the proximal direction, the axial limiting portions 19 of the deformable portion get closer to each other and the axial length of the deformable portion decreases. As a result, the bulge 18 extends further radially.

According to a preferred embodiment illustrated in FIGS. 3B and 4B, complete insertion of the collar 71 in the housing 41 corresponds to a configuration wherein the axial limiting portions 19 of the deformable portion contact each other, and the extension of the bulge 18 is maximal. In this configuration, the deformable portion 17 may form a closed loop.

A method for transferring a composition from the container sealed by the pierceable septum to the medical injection device will now be described in the following. In the method, the assembly functions as described previously. As such, the functioning of the elements of the assembly will not be described again in details.

The connector 2 is preferably connected to the injection device 60, and the resulting assembly 1 is stored before use. Otherwise, in a first step, the connector 2 is connected to the injection device 60 by inserting the tip 62 of the barrel 61 in the inner volume 12 of the inner deformable portion 10.

In the case where the housing 41 of the skirt 38 is previously covered by a sealing cap, said sealing cap is removed.

The connector 2 is then connected to the container 60. The collar 71 of the container is inserted in the housing 41. In this configuration, the skirt 38 is firmly attached to the collar 71 of the container and encloses said collar.

The insertion of the collar 71 in the housing 41 causes the septum 72 to push the distal part 14 of the inner portion 10. The inner deformable portion 10 transitions from the relaxed configuration to the compressed configuration. The bulge 18 extends further radially outwardly relative to the cover axis A.

The needle 63 pierces the inner portion 16 and the septum 72 of the container 70 at the pierceable portion 74. A portion 66 of the needle of a predetermined length thereby extends inside the container. The needle tip 64 preferably is located slightly distally relative to the septum 72, in the vicinity of the septum.

A first composition, contained in the injection device, is then transferred into the container prefilled with a second composition. To that end, the user pushes the plunger rod (not represented) of the injection device in the distal direction.

The first composition is then mixed with the second composition. To that end, the user may handle both the assembly 1 and the container 70 and shake them gently so as to allow the mixing.

The mixed compositions are then drawn back to the injection device.

To that end, the assembly 1 and the container 70 are turned upside down, and the user pulls the plunger rod of the injection device. In this position, the needle tip 64 remains immersed in the mixed compositions regardless the amount of compositions remaining in the container. Therefore, complete withdrawal can be achieved with no need to adjust the length of the portion 66 of the needle inserted in the container. In other terms, the user does not need to move the needle relative to the container as in the prior art for keeping the needle tip immersed in the mixed compositions as long as the withdrawal goes. This saves the user from having to perform complicated and imprecise manipulations in order to adjust the length of the portion of needle inserted in the container and makes the transfer between the injection device and the container much faster and easier.

During withdrawal, the connection between the proximal connection part 13 of the inner portion 10 and the tip 62 of the barrel 61 ensures the sealing of the assembly and prevents any leak from the assembly to the outside of said assembly.

The injection device 60 is then separated from the connector 2 by disengaging the tip 62 of the barrel from the inner volume 12 of the inner portion 10. The needle 63 disengages the septum 72 and the inner portion 10. The connector 2 remains connected to the container 70 and may be further disposed of. The injection device containing the mixed compositions is then ready to be used.

According to a preferred embodiment, the method described above is related to the reconstitution of a drug, wherein the first composition is a diluent and the second composition is a drug content, such as for example a lyophilized drug or an active substance of a drug.

The embodiments illustrated herein are mere examples of the present invention and should therefore not be construed as being limiting. Alternatives provided by a skilled person in consideration of the embodiments are likewise encompassed by the scope of protection of the present invention. Accordingly, the foregoing description is intended to be illustrative rather than restrictive. The invention described hereinabove is defined by the appended claims and all changes to the invention that fall within the meaning and range of equivalency of the claims are to be embraced within their scope.

The invention claimed is:

1. A connector for connecting a medical injection device, comprising a barrel and a needle extending from a distal tip of the barrel, to a container comprising a pierceable septum, the connector comprising:

an inner deformable cover extending along a cover axis, the inner deformable cover comprising a proximal connection part configured to engage the distal tip of the barrel, a distal portion pierceable by the needle, an inner body that defines an inner volume, and at least one deformable portion configured to form a bulge; and an outer rigid cover enclosing the inner deformable cover and comprising a distal adaptor configured to engage the container, the outer cover being configured such that a needle tip extends into the distal adaptor when the proximal connection part of the inner deformable cover engages the distal tip of the barrel, the outer rigid cover being fixed to the inner deformable cover such that the inner deformable cover and the outer rigid cover form a single assembly, wherein the inner deformable cover defines a first flange that abuts against a groove of a proximal part of the outer rigid cover such that the proximal connection part of the inner deformable cover is maintained in a fixed position relative to the outer cover, and wherein the inner deformable cover is compressible along the cover axis between:

a relaxed configuration wherein the distal portion of the inner deformable cover covers the needle tip and the deformable portion has a diameter greater than a diameter of the rest of the inner body and a compressed configuration wherein the distal portion is pierced by the needle, the needle tip extending distally out of said distal portion, the deformable portion forming the bulge when the inner deformable cover is in the compressed configuration.

2. The connector of claim 1, wherein, when said inner deformable cover is in the compressed configuration, the bulge extends radially and has a diameter greater than the diameter of the deformable portion when said inner deformable cover is in the relaxed configuration.

3. The connector of claim 2, wherein the at least one deformable portion comprises at least one bellow.

4. The connector of claim 3, wherein the outer rigid cover comprises an intermediate portion configured to accommodate the at least one deformable portion of the inner deformable cover in the relaxed configuration and in the compressed configuration.

5. The connector of claim 2, wherein the outer rigid cover comprises an intermediate portion configured to accommodate the at least one deformable portion of the inner deformable cover in the relaxed configuration and in the compressed configuration.

6. The connector of claim 2, wherein at least the at least one deformable portion of the inner deformable cover is made of elastomer material.

7. The connector of claim 2, wherein the distal adaptor comprises a stop wall which extends radially relative to the cover axis, and a skirt which extends from the stop wall in a distal direction, the skirt defining a housing configured to engage a collar of the container in a position wherein the pierceable septum of the container faces the stop wall, the stop wall being configured to act as a physical stop for the septum that prevents further movement of the container in a proximal direction.

8. The connector of claim 1, wherein the distal adaptor comprises a stop wall which extends radially relative to the cover axis, and a skirt which extends from the stop wall in a distal direction, the skirt defining a housing configured to engage a collar of the container in a position wherein the pierceable septum of the container faces the stop wall, the stop wall being configured to act as a physical stop for the septum that prevents further movement of the container in a proximal direction.

9. The connector of claim 8, wherein the stop wall is provided with an opening forming a passage for the distal portion of the inner deformable cover, the stop wall being located so that a portion of the needle of a determined length protrudes distally from the stop wall.

10. The connector of claim 9, wherein in the relaxed configuration, the distal portion of the inner deformable cover protrudes distally from the stop wall.

11. The connector of claim 9, wherein the skirt is adapted to deflect radially outwardly when connected to the container.

12. The connector of claim 9, wherein the skirt is provided with a plurality of flexible tabs separated from each other by recesses, the flexible tabs being configured to deflect radially outwardly when the skirt is connected to the container.

13. The connector of claim 8, wherein in the relaxed configuration, the distal portion of the inner deformable cover protrudes distally from the stop wall.

14. The connector of claim 8, wherein the skirt is adapted to deflect radially outwardly when connected to the container.

15. The connector of claim 8, wherein the skirt is provided with a plurality of flexible tabs separated from each other by recesses, the flexible tabs being configured to deflect radially outwardly when the skirt is connected to the container.

16. The connector of claim 8, wherein an inner surface of the skirt is provided with a plurality of ribs configured to contact the collar of the container for maintaining the container in a fixed position relative to the skirt.

17. The connector of claim 8, further comprising a sealing cap arranged at a distal end of the skirt.

18. An assembly comprising:

a medical injection device comprising a barrel and a needle extending from a distal tip of the barrel; and a connector according to claim 1, wherein the inner deformable cover engages the tip of the barrel, and wherein the needle tip extends into the distal adaptor, said needle tip being accommodated in a proximal part of the distal portion of the inner deformable cover.

19. The assembly of claim 18, wherein the needle of the medical injection device is staked in the distal tip of the barrel.

* * * * *